United States Patent [19]

Maitani et al.

[11] 4,247,028
[45] Jan. 27, 1981

[54] SUSPENSION STRAP FASTENER FOR CAMERA

[75] Inventors: Yoshihisa Maitani, Hachioji; Toyotaka Yamada, Hino, both of Japan

[73] Assignee: Olympus Optical Co., Ltd., Tokyo, Japan

[21] Appl. No.: 27,396

[22] Filed: Apr. 5, 1979

[30] Foreign Application Priority Data

Apr. 14, 1978 [JP] Japan .............................. 53/49076[U]

[51] Int. Cl.³ .......................... G03B 17/02; A45F 3/15
[52] U.S. Cl. ...................................... 224/267; 16/137; 224/908; 354/288
[58] Field of Search ................... 224/257, 45 R, 45 P, 224/49, 58, 235, 241, 254, 267, 268, 271, 272, 908; 16/128 R, 128 A, 137; 150/33; 354/288

[56] References Cited

U.S. PATENT DOCUMENTS

| 1,232,415 | 7/1917 | Whitney | 16/137 |
| 3,193,872 | 7/1965 | Freeman | 16/137 |
| 3,295,576 | 1/1967 | Schmitt et al. | 150/33 X |

Primary Examiner—Robert J. Spar
Assistant Examiner—Jerold M. Forsberg
Attorney, Agent, or Firm—Weinstein & Sutton

[57] ABSTRACT

A suspension strap fastener for camera including a rear lid which is pivotally mounted on a camera body by means of a hinge comprising a core shank and a pair of hinge plates, is mounted on a portion of the shank which is not engaged by the hinge plates. The fastener is also formed with a connection with a suspension strap.

6 Claims, 8 Drawing Figures

SUSPENSION STRAP FASTENER FOR CAMERA

BACKGROUND OF THE INVENTION

The invention relates to a suspension strap fastener for camera, and more particularly, to a fastener which is used to connect a hand or shoulder strap with the camera for portable use.

A prior arrangement for detachably connecting a strap with a camera for carrying the latter as suspended from hand or shoulder is illustrated in FIGS. 1 and 2 where a suspension fixture 3 which is machined from a metal material is secured to one side or either side of a camera body 1. As shown in FIG. 1, a connection member 4 comprising a metal wire which is formed into a triangle is passed through the fixture 3, and a loop of strap 2 is passed around the connection member 4. The fixture 3 is formed by cutting a metal material into an ear form, and hence the manufacture and mounting of this member onto the camera is both time and labor consuming, resulting in an increased cost. Hence, there has been a need for a suspension strap fastener which is economically manufactured and mounted on the camera body.

One possibility to provide a suspension fastener which is simple in construction and easy to manufacture is indicated in FIG. 2. As is well known, a camera body 1 is provided with a hinge 6 which is used to pivotally mount a rear lid 5. When a film is to be loaded into the camera, the lid 5 is opened. The hinge 6 comprises a knuckle which is disposed on a core shank and which is normally exposed outside of the camera body 1.

SUMMARY OF THE INVENTION

It is an object of the invention to provide a suspension strap fastener which overcomes the disadvantage of the prior art by utilizing a hinge which pivotally mounts a rear lid on a camera body.

In accordance with the invention, the core shank of the hinge which pivotally mounts a rear lid of a camera includes a portion which is free from the knuckle of the hinge. A suspension fastener comprising a strip is pivotally mounted on the free portion of the core shank and a suspension strap is either directly or indirectly mounted on the free end of the fastener. Thus, a time and labor consuming work involved with cutting a metal material into a special form and then securing it to a camera body is avoided. The suspension fastener of the invention can be formed by a simple process of folding a strip, thus greatly reducing the manufacturing cost and providng a simple construction for fastener in an economical manner.

DESCRIPTION OF PREFERRED EMBODIMENTS

Figure 1:
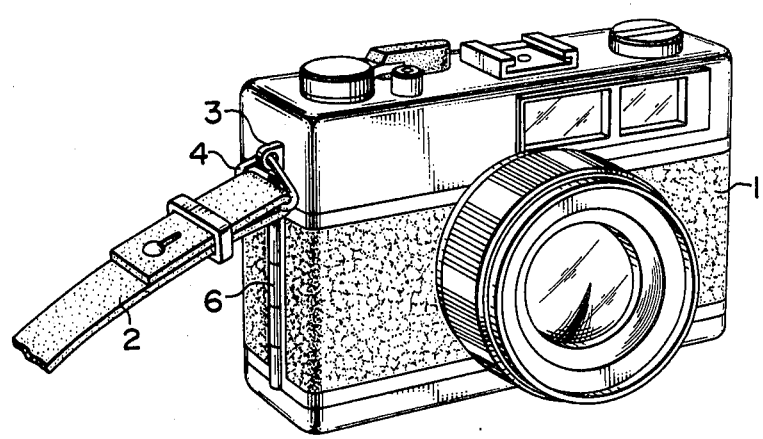
FIG. 1 is a perspective view of a conventional suspension strap fastener secured to a camera body.
Figure 2:
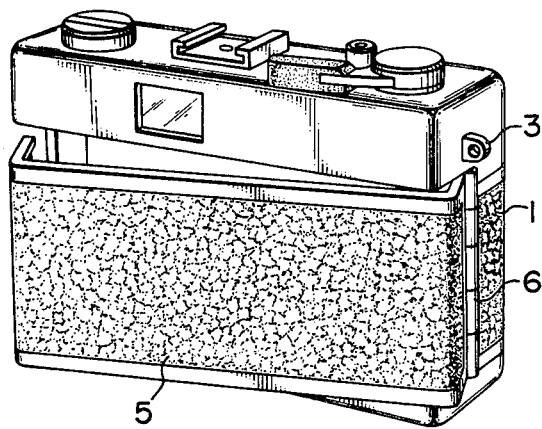
FIG. 2 is a perspective view of the camera shown in FIG. 1, as viewed from the rear side thereof.
Figure 3:
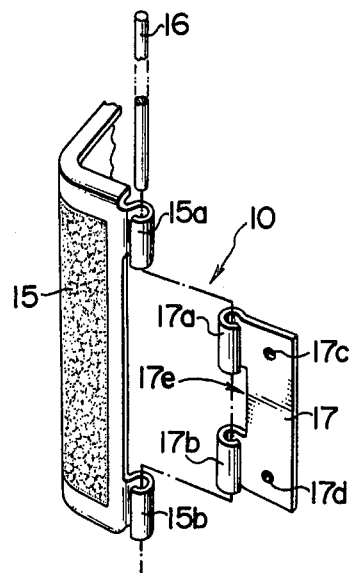
FIG. 3 is an exploded perspective view of a hinge which pivotally mounts a rear lid and on which the suspension fastener of the invention is mounted.
Figure 4:
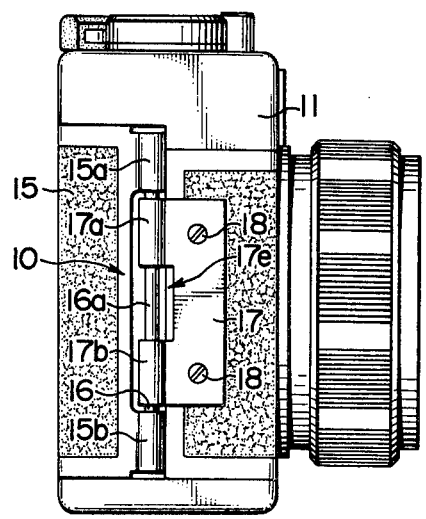
FIG. 4 is a side elevation of a camera with the cover lid mounted on the camera body by means of the hinge shown in FIG. 3.
Figure 5:
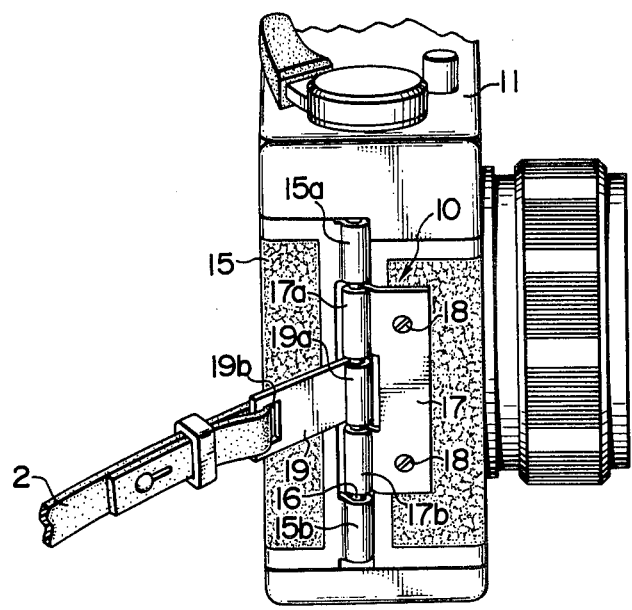
FIG. 5 is a perspective view of the fastener shown in FIG. 4 to which a suspension strap is connected.

Referring to FIGS. 3 and 4, there is shown a hinge 10 which pivotally mounts a rear lid on a camera body. The rear lid is shown at 15 and if formed with a pair of knuckles 15a, 15b which are disposed on a core shank 16. The rear lid 15 forms one of the hinge plates. The other hinge plate is shown at 17 and is formed with a pair of knuckles 17a, 17b which are spaced from the first mentioned knuckles 15a, 15b lengthwise of the shank 16. The hinge plate 17 is adapted to be secured to one side of a camera body 11 by means of screws 18 which pass through bores 17c, 17d formed in the hinge plate 17 and engage threaded bores (not shown) formed in the side of the camera body. It will be noted that knuckles 17a, 17b are formed along the edge of the hinge plate 17 which is located opposite to the rear lid 15 adjacent to the opposite ends thereof. A recess 17e is formed between these knuckles 17a, 17b. As a consequence, when these hinge plates are assembled with the shank 16, a central portion 16a remains exposed on which a fastener 19, 29, 39, to be described later in connection with FIGS. 5, 6 and 8, may be mounted. FIG. 5 shows a suspension fastener 19 according to one embodiment of the invention. The fastener 19 is in the form of a strip, one longitudinal end of which is shaped into a knuckle 19a which is rotatably fitted over the shaft portion 16a. Adjacent to its other end, the fastener 19 is formed with a rectangular opening 19b through which a suspension strap 2 is passed.

Figure 6:
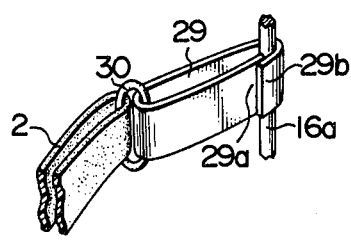
FIG. 6 is a perspective view of a fastener according to another embodiment of the invention.
Figure 7:
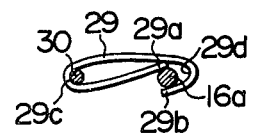
FIG. 7 is a plan view of the fastener shown in FIG. 6 as mounted on a core shank of the hinge.

FIG. 6 shows a fastener 29 according to another embodiment. In this embodiment, the fastener 29 comprises a single resilient metal strip which is formed into a flat ring, as viewed in cross section, so that its opposite ends 29a, 29b are disposed in overlapping relationship. The overlapping ends of the fastener 29 are mounted on the shank portion 16a. Specifically, referring to FIG. 7, the ring has an inner end 29a and an outer end 29b, and the ring is shaped so as to define a first curved portion 29c and a second curved portion 29d both having a smaller radius of curvature. By pushing the inner end 29a inwardly into the loop, a gap is formed between the both ends 29a, 29b, and the ring in the compressed form is disposed around the shank portion 16a and the latter passed into the loop. When the inner end 29a is then released, it returns, by its own resilience, into abutment against the outer end 29b, thus closing the gap mentioned above. In this manner, the fastener 29 is mounted on the shank portion 16a. A ring coupler 30 is passed around the other curved portion 29c, and is also coupled with a suspension strap 2. It will be seen that if it is unnecessary to use the suspension strap, the fastener can be removed from the shaft portion 16a.

Figure 8:
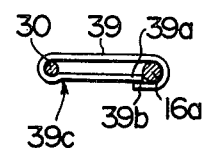
FIG. 8 is a plan view of a fastener according to a further embodiment of the invention.

FIG. 8 shows a further embodiment of the invention which stabilizes the location of the fastener of the shank portion 16a. Specifically, a fastener 39 again comprises a resilient metal strip shaped into a flat ring having an inner end 39a and an outer end 39b. A curved portion 39c of the fastener around which the ring 30 is passed is slightly bent inwardly to secure it in position. The inner end 39a is folded inwardly to bear against the shank portion 16a when the latter is positioned. Again, the fastener 39 can be removed from the shank portion 16a whenever it is unnecessary to use a suspension strap.

What is claimed is:

1. A camera having a camera body, a rear cover, and a hinge pivotally mounting said rear cover on said camera body; said hinge including a shaft and spaced-apart knuckles mounted on said shaft to define an uncovered shaft portion spaced from the ends of said shaft; said hinge further including first and second hinge plates; said spaced-apart knuckles being disposed on said first and second hinge plates; a strap fastener having a first end pivotally and removably mounted on said uncovered shaft portion and a second end for connection to a camera strap, said shaft extending through said spaced-apart knuckles to cooperatively connect said first and second hinge plates and said strap fastener to said camera body and to said rear cover of said camera.

2. A camera according to claim 1 wherein said hinge plates are pivotally connected with said shaft and wherein the fastener is pivotally connected with said shaft intermediate the pivotal connections of the hinge plates with the shaft.

3. A camera according to claim 1 in which the fastener is formed with a knuckle at its first end which is rotatably disposed on the central portion of the shaft, the second end of the fastener being formed with an opening through which to pass a suspension strap.

4. A camera according to claim 1 in which the fastener is in the form of a resilient metal strip which is shaped into a flat ring in cross section so as to have its opposite ends disposed in overlapping abutting relationship, the overlapping ends adapted to be spread apart to receive the central portion of the shaft therein, whereupon the ends are released to return into abutting relationship.

5. A camera according to claim 4 in which one end of the flat ring is adapted to receive the shaft while the other end is adapted to receive a suspension strap therein.

6. A camera according to claim 4 in which one end of the strip is disposed in abutment against the shaft after the latter has been received within the fastener, thus stabilizing the location of the fastener.

* * * * *

UNITED STATES PATENT AND TRADEMARK OFFICE
CERTIFICATE OF CORRECTION

PATENT NO. : 4,247,028
DATED : January 27, 1981
INVENTOR(S) : Yoshihisa Maitani et al It is certified that error appears in the above—identified patent and that said Letters Patent is hereby corrected as shown below:

Column 2, line 12, change "if" to --is--.

Column 2, line 62, change "of" at the second occurrence to --on--.

Signed and Sealed this

Twelfth Day of May 1981

[SEAL]

Attest:

RENE D. TEGTMEYER

Attesting Officer

Acting Commissioner of Patents and Trademarks